United States Patent Office 3,152,172
Patented Oct. 6, 1964

3,152,172
HEXACHLOROCYCLOPENTADIENE - TETRA-
HYDROPHTHALIC ANHYDRIDE ADDUCT
AND DERIVATIVES
Carleton W. Roberts, Midland, and Daniel H. Haigh,
Beaverton, Mich., assignors to The Dow Chemical
Company, Midland, Mich., a corporation of Delaware
No Drawing. Filed Nov. 24, 1961, Ser. No. 154,882
11 Claims. (Cl. 260—468)

This invention relates to new halogenated organic compounds. More particularly, it relates to the Diels-Alder adduct of hexachlorocyclopentadiene and tetrahydrophthalic anhydride and to derivatives thereof.

This application is a continuation-in-part of our copending application, Serial No. 48,823, filed August 11, 1960, now abandoned.

The compounds which are the subject of this application are represented by the structure

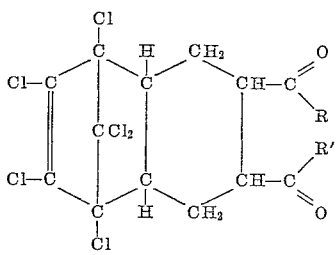

wherein R and R' taken together constitute an oxygen atom or R and R' taken separately are independently selected from the group consisting of hydroxyl, alkoxy, cycloalkoxy, and alkenoxy radicals. The general structure shown above therefore defines not only the dicarboxylic anhydride obtained by the Diels-Alder addition of hexachlorocyclopentadiene and tetrahydrophthalic anhydride, but also derivatives of the anhydride adduct, including the dicarboxylic acid, and the mono- and diesters of the acid with monohydric aliphatic and cycloaliphatic alcohols.

The anhydride adduct, from which the free acid and esters may be made, is conveniently prepared by heating together approximately equal molar proportions of hexachlorocyclopentadiene and tetrahydrophthalic anhydride, either in an inert, high-boiling solvent such as an aromatic hydrocarbon or halohydrocarbon, for example toluene or o-dichlorobenzene, at about 150–200° C. or the two reactants may be heated together at about the same temperature in the absence of a solvent. When the reaction is substantially complete, the product may be separated by cooling the reaction mixture and allowing the adduct to crystallize, or, if a solvent has been employed, the solvent may be evaporated to leave a solid reaction mass which may then be purified by recrystallization from a suitable solvent. The free dicarboxylic acid and the esters may be prepared from the anhydride by conventional methods or the acid and esters may be prepared by the Diels-Alder addition of hexachlorocyclopentadiene and tetrahydrophthalic acid or its esters.

All these compounds which are described by the above shown general structure can exist in low-melting and high-melting forms which differ structurally as cis and trans molecular configurations. The proportion of these two isomeric forms in the products obtained is dependent upon the reaction conditions used in their preparation.

Example 1

A solution of 2 g. moles of hexachlorocyclopentadiene and 2 g. moles of cis-tetrahydrophthalic anhydride in 1500 cc. o-dichlorobenzene was put in a 3 liter flask equipped with a reflux condenser and heated by an electrical heating mantle. The solution was heated to reflux temperature and allowed to reflux for 29 hours. It was then cooled to room temperature and the solid which separated from the cold solution was collected by filtration and recrystallized from methyl ethyl ketone. A white crystalline solid was obtained, M.P. 275–276° C., weight 525 g., corresponding to yield 62 percent of the theoretical. Elemental analysis showed: Carbon, 36.84 percent; hydrogen, 1.86 percent; chlorine, 50.10 percent. Calculated for

$C_{13}H_8Cl_6O_3$

Carbon, 38.85 percent; hydrogen, 1.89 percent; chlorine, 50.35 percent. The infrared spectrum was consistent with the structure of the expected adduct, 1,2,3,4,9,9-hexachloro - 1,4,4a,5,6,7,8,8a-octahydro-1,4-methanonaphthalene-6,7-dicarboxylic anhydride.

Example 2

In a 3 liter 3-necked, round-bottomed flask equipped with a reflux condenser, air stirrer, nitrogen inlet tube and heating mantle was placed a mixture of 456 g. of cis-tetrahydrophthalic anhydride, 816 g. of hexachlorocyclopentadiene and 159 g. (12.5 percent based on reactants) of m-xylene. The mixture was warmed slowly to a mantle temperature of 195° C. and a reaction temperature of 176° C. During the course of the reaction (16 hours), the reaction temperature fell to 156° C. The mixture was permitted to cool to 100° C. and 300 ml. of m-xylene was added. The vigorously stirred mixture was cooled in an ice water bath for three hours. The solid was collected on a suction filter. It was washed with two 100 ml. portions of m-xylene and with three 200 ml. portions of n-heptane. The air dried crude product was dried in a vacuum oven at 110° C. for 16 hours. The weight of crude product was 1042 g. (81 percent); M.P., 240° C. The crude product was recrystallized, after charcoal decolorization, from 4200 ml. of 1,2-dibromoethane. A first crop, 775 g. M.P. 280° C., was obtained. In addition, 154 g. (12 percent) of low-melting isomer, M.P. 230° C., was isolated from this mother liquor. Analysis confirmed the structures of both products as the anhydride product of Example 1.

A total yield of adduct, considering both high and low melting isomers, was 929 g. or 72.8 percent. Additional product and unreacted starting materials were isolated from the original combined filtrates. It is of interest to note that running the reaction for 16 hours at temperatures below 190° C. gave at least a 12 percent yield of low-melting isomer.

Examples 3 and 4 illustrate the preparation of the high-melting and low-melting forms of the dicarboxylic acid from the corresponding forms of the anhydride. In this and the following examples, the word anhydride is used to identify the product of Examples 1 and 2 for purposes of brevity.

Example 3

A mixture of 42.5 g. of high-melting anhydride in 400 ml. of water containing 16 g. of sodium hydroxide was warmed on the steam bath in a 1 liter round-bottomed flask. The warm, clear solution was filtered and cooled, and the solution was made acid by the careful addition of an excess of sulfuric acid. The white crystalline precipitate was collected on a suction filter and washed with water. The air-dried solid was further dried under vacuum at 60° C. for 16 hours to yield 42 g. (96 percent) of high-melting diacid, M.P. 274° C. The original high-melting anhydride, M.P. 277–278° C., on mixture with an equivalent of the hydrolysis product gave a M.P. 260–274° C. Infrared spectra and a neutral equivalent titration confirmed the structure of the product as 1,2, 3,4,9,9 - hexachloro - 1,4,4a,5,6,7,8,8a - octahydro - 1,4-methanonaphthalene-6,7-dicarboxylic acid.

*Example 4*

A mixture of 42.5 g. of low-melting anhydride in 400 ml. of water containing 16 g. of sodium hydroxide was warmed on the steam bath in a 1 liter round-bottomed flask. The warm, clear solution was filtered and cooled, and the solution was made acid by the careful addition of sulfuric acid. The semi-solid mass which resulted was separated by filtration, washed with water and air dried. The mixture was triturated with toluene and the resulting crystalline solid filtered by suction. The dried solid amounted to 41 g. (93 percent) and had a M.P. 221° C. The original low melting anhydride, M.P. 225° C., on mixture with an equivalent of the isolated acid showed a M.P. 210–220° C. Infrared spectra and neutral equivalent determination confirmed the structure of the product as identical with that of Example 3.

*Example 5*

In a 1 liter single-necked, round-bottomed flask equipped with a reflux condenser protected with a Drierite tube, a nitrogen inlet tube and cooled in an ice water bath, was placed a mixture of 42.5 g. of high-melting anhydride, 1.8 g. of water and 500 ml. of anhydrous methanol containing 0.05 g. of p-toluenesulfonic acid. The mixture was transferred to a steam bath and heated under reflux for 2 hours. The cooled mixture was immersed in an ice bath and dry hydrogen chloride bubbled through the mixture for 20 minutes. The resulting mixture was let stand at room temperature for three hours. The solution was poured over 1 kg. of ice and the resulting mixture filtered. The precipitated white solid was washed with water and air dried. The crude product (44 g.) was dissolved in 500 ml. of benzene, washed first with a 5 percent aqueous solution of sodium bicarbonate and then with water, treated with anhydrous magnesium sulfate, filtered and evaporated to dryness under vacuum on a 60° C. bath. The resulting solid was triturated in n-heptane and filtered. The dried solid amounted to 42 g. (98 percent), M.P. 102–103° C. Infrared spectra and elemental analysis confirmed the structure of the product as the dimethyl ester.

*Example 6*

In a 1 liter single-necked, round-bottomed flask equipped with a reflux condenser and a water trap was placed a mixture of 42.5 g. of high-melting anhydride, 300 ml. of anhydrous isopropyl alcohol, 250 ml. of trichloroethylene and 0.5 g. of p-toluenesulfonic acid. The mixture was heated under reflux conditions with slow distillation of the water azeotrope for 24 hours. The reaction mixture was cooled and the toluenesulfonic acid was neutralized with sodium bicarbonate. The organic layer was washed with water, dried over anhydrous magnesium sulfate and filtered. The solvent was evaporated under reduced pressure and the residue recrystallized from n-heptane. There was obtained 36 g. of solid, M.P. 119–120° C. This upon analysis proved to be the monoisopropyl ester rather than the diester.

*Example 7*

In a 1 liter single-necked, round-bottomed flask equipped with a reflux condenser and a water trap was placed a mixture of 42.5 g. of high melting anhydride, 148 g. of n-butanol, 500 ml. of anhydrous toluene and 0.5 g. of p-toluenesulfonic acid. The reaction mixture was heated to boiling, and distillation was continued for 48 hours during which time 4 ml. of water had separated in the trap. The cooled reaction mixture was treated with sodium bicarbonate and extracted with two 300 ml. portions of a saturated aqueous solution of sodium chloride. The organic layer was dried over anhydrous magnesium sulfate and filtered. The excess butyl alcohol and toluene were removed by distillation under reduced pressure. The residual oil was taken up in methyl alcohol, warmed, decolorized, filtered and chilled. A total of 40 g. (73 percent) of dibutyl ester was obtained, M.P. 56–57° C. Infrared examination and elemental analysis confirmed the identity of the product.

*Example 8*

A mixture of 42.5 g. of low-melting anhydride, 98.9 g. of n-butanol, and 0.5 g. of p-toluenesulfonic acid was heated at reflux temperature for 42 hours. After cooling, 250 ml. of benzene was added and the solution was worked up as in Example 7. There was separated two forms of the dibutyl ester, one identical with the product of Example 7 and amounting to 11 g., the other a high-boiling liquid amounting to 21 g. and found upon analysis to be the low melting form of the dibutyl ester. This material had the following properties: B.P. 190° C./0.1 mm., $n_D^{25°\ C.}$ 1.5190, $d_4^{25°\ C.}$ 1.3533. It was assumed that the starting anhydride had contained both high and low-melting forms.

*Example 9*

A mixture of 42.5 g. of high-melting anhydride, 52 g. of 1-octanol, 500 ml. of anhydrous benzene, and 0.5 g. of p-toluenesulfonic acid was heated at reflux temperature for 24 hours, removing water as formed. The resulting solution was worked up by the procedure of Example 7. The recrystallized product amounted to 31 g., M.P. 33–34° C., and was identified as dioctyl 1,2,3,4,9,9-hexachloro - 1,4,4a,5,6,7,8,8a - octahydro - 1,4 - methanonaphthalene-6,7-dicarboxylate.

*Example 10*

In a reaction flask similar to those used in previous esterification examples, a mixture of 424 g. of anhydride, 520.8 g. of 2-ethyl-1-hexanol, and a catalytic quantity of p-toluenesulfonic acid was heated at reflux temperature for 96 hours. The cooled reaction mixture was washed with water, neutralized by washing with dilute aqueous potassium carbonate, and extracted with chloroform. The chloroform extract was dried over anhydrous magnesium sulfate, the chloroform was evaporated and the excess alcohol was removed by distillation under reduced pressure. The residue was a yellow viscous liquid amounting to 491 g. Elemental analysis and infrared examination confirmed the identity of this material as the bis(2-ethylhexyl)ester in 99% purity.

*Example 11*

In the reaction flask of Example 2, a mixture of 849.6 g. of anhydride, 464.6 g. of allyl alcohol, 2.3 g. of tert-butylpyrocatechol (polymerization inhibitor), 2.5 g. of p-toluenesulfonic acid, and 500 ml. of dry toluene was refluxed for 72 hours, at which time 36 g. of water had been separated. The reaction solution was then worked up by a procedure similar to that previously described. The crystalline product obtained was recrystallized from petroleum ether. The product was a white crystalline solid, M.P. 78–79° C., amounting to a yield of 70% based on the starting anhydride. Analysis confirmed its identity as the diallyl ester.

*Example 12*

By a procedure similar to that of Example 11, but using approximately equimolar proportions of reactants, the anhydride was monoesterified with 2-methylallyl alcohol. The recrystallized mono-2-methylallyl ester obtained was a white crystalline solid, M.P. 124–126° C.

In a similar manner, other mono and dialkyl and cycloalkyl esters and mono and dialkenyl esters may be made by reaction of the proper alcohol or its equivalent with the anhydride adduct or the free dicarboxylic acid under esterifying conditions. Thus, esters such as the mono and diethyl esters, mono and dihexyl esters, mono and dilauryl esters, mono and dihexenyl esters, mono and dioctenyl esters, and mono and dicyclohexyl esters may be prepared. The alkyl esters may also be made by the Diels-Alder addition of hexachlorocyclopentadiene to the corresponding ester of tetrahydrophthalic acid.

The compounds are useful in the control of internal parasitic worms in animals. Mice which had been infected with mouse tapeworm, mouse trichostrongylid larvae, or pig ascarid larvae were substantially or entirely freed of such infestations when fed for a period of days with diets containing from 0.06 to 0.25% by weight of these compounds.

The esters in particular and all the compounds in general are also effective fire-resistant plasticizers for polyvinyl chloride and ethylcellulose resins.

We claim:
1. A compound having the structure

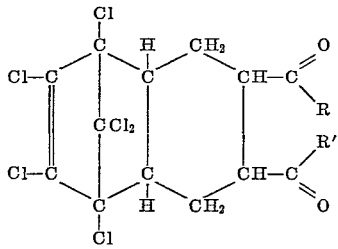

wherein R is selected from the group consisting of hydroxyl, alkoxy of 1–12 carbon atoms, and alkenyloxy of 1–8 carbon atoms, and R' is selected from the group consisting of alkoxy of 1–12 carbon atoms and alkenyloxy of 1–8 carbon atoms.

2. The compounds of claim 1 wherein R is hydroxyl and R' is alkoxy of 1–12 carbon atoms.
3. The compounds of claim 1 wherein R and R' are alkoxy of 1–12 carbon atoms.
4. The compounds of claim 1 wherein R is hydroxyl and R' is alkenyloxy of 1–8 carbon atoms.
5. The compounds of claim 1 wherein R and R' are alkenyloxy of 1–8 carbon atoms.
6. Dimethyl 1,2,3,4,9,9-hexachloro-1,4,4a,5,6,7,8,8a-octahydro-1,4-methanonaphthalene-6,7-dicarboxylate.
7. Isopropyl hydrogen 1,2,3,4,9,9-hexachloro-1,4,4a,5,6,7,8,8a - octahydro - 1,4 - methanonaphthalene-6,7-dicarboxylate.
8. Dibutyl 1,2,3,4,9,9-hexachloro-1,4,4a,5,6,7,8,8a-octahydro-1,4-methanonaphthalene-6,7-dicarboxylate.
9. Dioctyl 1,2,3,4,9,9 - hexachloro - 1,4,4a,5,6,7,8,8a-octahydro-1,4-methanonaphthalene-6,7-dicarboxylate.
10. Diallyl 1,2,3,4,9,9-hexachloro-1,4,4a,5,6,7,8,8a-octahydro-1,4-methanonaphthalene-6,7-dicarboxylate.
11. 2-methylallyl hydrogen 1,2,3,4,9,9-hexachloro-1,4,4a,5,6,7,8,8a - octahydro - 1,4-methanonaphthalene-6,7-dicarboxylate.

References Cited in the file of this patent
UNITED STATES PATENTS

| | | |
|---|---|---|
| 2,733,248 | Lidov | Jan. 31, 1956 |
| 2,806,057 | Finch | Sept. 10, 1957 |
| 3,017,431 | Schmerling | Jan. 16, 1962 |

OTHER REFERENCES

Shriner et al.: Identification of Organic Compounds (Third Edition, 1948), pages 153–4.

Fields: Jour. Amer. Chem. Soc., vol. 76 (1954), pages 2709–10.

Vol'fson et al.: Chemical Abstracts, vol. 50 (1956), col. 11301g (abstract of Doklady Akad. Nauk.) USSR, 105 (1955).